(12) United States Patent
Eames et al.

(10) Patent No.: US 7,313,591 B2
(45) Date of Patent: Dec. 25, 2007

(54) METHODS, COMPUTER READABLE MEDIUMS AND SYSTEMS FOR REQUESTING, RETRIEVING AND DELIVERING METADATA PAGES

(75) Inventors: Russell Mark Eames, Redmond, WA (US); Thomas Fakes, Redmond, WA (US); Jason E. D. McCartney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 10/622,972

(22) Filed: Jul. 18, 2003

(65) Prior Publication Data

US 2005/0015551 A1 Jan. 20, 2005

(51) Int. Cl.
G06F 15/16 (2006.01)
(52) U.S. Cl. .................................. 709/203; 709/201
(58) Field of Classification Search ............... None
See application file for complete search history.

(56) References Cited

U.S. PATENT DOCUMENTS

| | | | |
|---|---|---|---|
| 5,721,911 A | 2/1998 | Ha et al. | |
| 6,061,680 A | 5/2000 | Scherf et al. | |
| 6,118,450 A | 9/2000 | Proehl et al. | |
| 6,154,773 A | 11/2000 | Roberts et al. | |
| 6,311,194 B1 | 10/2001 | Sheth et al. | |
| 6,345,256 B1 | 2/2002 | Milsted et al. | |
| 6,418,421 B1 | 7/2002 | Hurtado et al. | |
| 6,549,922 B1 | 4/2003 | Srivastava et al. | |
| 6,560,607 B1 | 5/2003 | Lassesen | |
| 6,591,295 B1 | 7/2003 | Diamond et al. | |
| 6,760,721 B1 | 7/2004 | Chasen et al. | |
| 6,941,324 B2 | 9/2005 | Plastina et al. | |
| 2002/0041692 A1 | 4/2002 | Seto et al. | |
| 2002/0059584 A1 | 5/2002 | Ferman et al. | |
| 2002/0099694 A1 | 7/2002 | Diamond et al. | |
| 2002/0113824 A1 | 8/2002 | Myers | |
| 2002/0120925 A1 | 8/2002 | Logan | |
| 2002/0147728 A1 | 10/2002 | Goodman et al. | |
| 2002/0161855 A1 | 10/2002 | Manczak et al. | |
| 2002/0184180 A1 | 12/2002 | Debique et al. | |
| 2003/0012549 A1 | 1/2003 | Ohnuma | |
| 2003/0028796 A1 | 2/2003 | Roberts et al. | |

(Continued)

OTHER PUBLICATIONS

Bainbridge et al., "*Towards a Digital Library of Popular Music,*" Proceedings of the Fourth ACM Conference on Digital Libraries, 1999, pp. 161-169, ACM Press, New York, U.S.A.

(Continued)

*Primary Examiner*—Ilwoo Park
(74) *Attorney, Agent, or Firm*—Senniger Powers (57) ABSTRACT

Methods, computer readable mediums and systems provide media player users with a full contextual metadata experience. Metadata include multiple forms of property data, or information, relating to media accessed by a media player, such as a CD in a CD-ROM drive of a computer. Metadata is transferred from a server to a client. Identification parameters associated with the accessed media file are submitted by the client to a server, and property data is retrieved and forwarded to the client. The metadata provides the user with integrated, contemporaneous property data directly related to the media file being played, providing automatic, integrated access to data from multiple databases, simply by accessing a related media file through a media player, without further direction from the user.

26 Claims, 6 Drawing Sheets

U.S. PATENT DOCUMENTS

| | | | |
|---|---|---|---|
| 2003/0033420 | A1 | 2/2003 | Eyal et al. |
| 2003/0036948 | A1 | 2/2003 | Woodward et al. |
| 2003/0084460 | A1* | 5/2003 | Chung et al. ............... 725/142 |
| 2003/0093790 | A1 | 5/2003 | Logan et al. |
| 2003/0135513 | A1 | 7/2003 | Quinn et al. |
| 2003/0236582 | A1 | 12/2003 | Zamir et al. |
| 2004/0017997 | A1 | 1/2004 | Cowgill |
| 2005/0203992 | A1* | 9/2005 | Tanaka et al. ............... 709/203 |

OTHER PUBLICATIONS

Balabanovic et al., "*Fab: Content-Based, Collaborative Recommendation,*" Communications of the ACM, Mar. 1997, pp. 66-72, vol. 40, Issue 3, ACM Press, New York, U.S.A.

Computall Services, "*Unofficial CD Text FAQ,*" www.ncf.carleton.ca/~aa571/cdtext.htm, webpage visited Jul. 7, 2003, USA.

Crossen et al., "*Flytrap: Intelligent Group Music Recommendation,*" Proceedings of the 7th International Conference on Intelligent User Interfaces, 2002, pp. 184-185, ACM Press, New York, U.S.A.

El Saddik et al., "*Metadata for Smart Multimedia Learning Objects,*" Proceedings of the Australasian Conference on Computing Education, 2000, pp. 87-94, ACM Press, New York, U.S.A.

Field et al., "*Personal DJ, an Architecture for Personalised Content Delivery,*"Proceedings of the Tenth International Conference on World Wide Web, 2001, pp. 1-7, ACM Press, New York, U.S.A.

Hjelsvold et al., "*Web-Based Personalization and Management of Interactive Video,*" Proceedings of the Tenth International Conference on World Wide Web, 2001, pp. 129-139, ACM Press, New York, U.S.A.

Hu et al., "*Multimedia Description Framework (MDF) for Content Description of Audio/Video Documents,*" Proceedings of the Fourth ACM Conference on Digital Libraries, 1999, pp. 67-75, ACM Press, New York, U.S.A.

Merialdo et al., "*Automatic Construction of Personalized TV News Programs,*" Proceedings of the Seventh ACM International Conference on Multimedia (Part 1), 1999, pp. 323-331, ACM Press, New York, U.S.A.

Minibayeva et al., "*A Digital Library Data Model for Music,*" Proceedings of the Second ACM/IEEE-CS Joint Conference on Digital Libraries, 2002, pp. 154-155, ACM Press, New York, U.S.A.

Pachet, "*Content Management for Electronic Music Distribution,*" Communications of the ACM, Apr. 2003, pp. 71-75, vol. 46, Issue 4, ACM Press, New York, U.S.A.

Pampalk, et al., "*Content-based Organization and Visualization of Music Archives,*" Proceedings of the 2002 ACM Workshops on Multimedia, 2002, pp. 570-579; ACM Press, New York, U.S.A.

Ryu et al., "*MPEG-7 Metadata Authoring Tool,*" Proceedings of the Tenth ACM International Conference on Multimedia, 2002, pp. 267-270, ACM Press, New York, U.S.A.

Scott, et al., "*Abstracting Application-Level Web Security,* " Proceedings of the Eleventh International Conference on World Conference on World Wide Web, 2002, pp. 396-407, ACM Press, New York, U.S.A.

\* cited by examiner

METHODS, COMPUTER READABLE MEDIUMS AND SYSTEMS FOR REQUESTING, RETRIEVING AND DELIVERING METADATA PAGES

TECHNICAL FIELD

Embodiments of the present invention relate to the field of processing media content. In particular, embodiments of this invention relate to processing requests for metadata from clients by identifying, retrieving and rendering such metadata.

BACKGROUND OF THE INVENTION

Many known computer systems play media files, such as those stored on compact discs (CDs). Such systems typically provide some modicum of information relating to the media file being played. For instance, most computers capable of playing a CD provide a listing of the number of songs, or tracks stored on the CD. Such a list would typically include the order in which such tracks are stored on the CD and the length of each track. These systems typically do not provide other basic information, such as the artist, or artists, featured on the CD or the track names. Such systems do not satisfy the needs of users who desire additional textual or visual information relating to the CDs they are enjoying.

Other more advanced systems, such as CD Text encoded CDs and compatible media players are capable of storing more information on the CDs themselves. For example, these systems are capable of storing album titles, artist names and song titles on a particular music CD. With a compatible player, such CDs display this additional information when playing a CD. However, these systems lack the ability to provide additional textual information relating to the contents of the CD. They also lack the ability to provide updated and timely information beyond what is stored on the CD at the time of manufacture.

Accordingly, a system for providing users with a full contextual metadata experience, including multiple forms of information relating to the media currently accessed by a media player, such as a CD in a CD-ROM drive of a computer, is desired to address one or more of these and other disadvantages.

SUMMARY OF THE INVENTION

Embodiments of the invention overcome one or more deficiencies in the known art by providing, among other things, methods, computer readable mediums and systems for providing media player users with a full contextual metadata experience, including multiple forms of information relating to media accessed by a media player, such as a CD in a CD-ROM drive of a computer.

In at least one embodiment, the method transfers metadata from a server to a client. The metadata include property data associated with a media file accessible by the client. The method submits an identification parameter associated with the accessed media file from the client to a server, retrieves the property data, and forwards the property data to the client. This greatly enhances the overall contextual metadata experience for the user by providing integrated, contemporaneous property data directly related to the media file being played. Thus, embodiments of the invention provide automatic, integrated access to data from multiple databases, simply by accessing a related media file through a media player, without further direction from the user.

A method for retrieving metadata for a media file accessible via a media player is disclosed. The metadata include property data associated with the media file. The method comprises determining that the media file is accessed by the media player and submitting an identification parameter associated with the accessed media file to a server when the determining that the media file is accessed by the media player indicates that the media file is accessed by the media player. The server receives the property data corresponding to the accessed media file from the server.

Another method retrieves metadata for a media file accessible via a media player. The metadata include property data associated with the media file. The method comprises determining whether a first identification parameter associated with the media file is stored on the media player. A second identification parameter associated with the accessed media file is submitted to receive the property data from a server when the determining whether a first identification parameter associated with the media file is stored on the media player indicates the first identification parameter is not stored on the media player. The method comprises determining whether the property data is stored on the media player when the determining whether a first identification parameter associated with the media file is stored on the media player indicates the first identification parameter is stored on the media player. The first identification parameter associated with the accessed media file is submitted to receive the property data from a server when the determining whether the property data is stored on the media player indicates the property data is not stored on the media player. The method further comprises determining whether an artist ID is a known various artists value on the media player when the determining whether the property data is stored on the media player indicates the property data is stored on the media player. The first identification parameter associated with the accessed media file is submitted to receive the property data from a server when the determining whether an artist ID is a known various artists value on the media player indicates the artist ID is a known various artists value. The property data is rendered on the media player when the determining whether an artist ID is a known various artists value on the media player indicates the artist ID is not a known various artists value.

In yet another embodiment, a method for rendering metadata for a media file accessible via a media player is disclosed. The metadata include property data associated with the media file. The method comprises determining that the media file is accessed by the media player and identifying an identification parameter of the media file stored on the media player when the determining that the media file is accessed by the media player indicates that the media file is accessed by the media player. The method further comprises determining that the property data associated with the identification parameter of the accessed media file is stored on the media player. The property data stored on the media player is rendered.

In another embodiment, a method renders metadata for a media file accessible via a media player. The metadata include property data associated with the media file and comprises requesting the property data from a server when at least one of (a) a content ID is not stored on the media player, (b) the property data is not stored on the media player and (c) an artist ID is a known various artists value are true. The property data stored on the media player is accessed when (a), (b) and (c) are false. The method additionally comprises rendering the property data.

In still another embodiment, a method for providing an XML document to a client comprises receiving an identification parameter for an XML document from a client. The method determines if all necessary identification parameters are present and retrieves any missing identification parameters when the determining if all necessary identification parameters are present indicates that identification parameters are missing. The method forwards the identification parameters to a structural query language (SQL) Server, receives the XML document from the SQL Server, and forwards the XML document to the client.

In a further embodiment, a method for transferring metadata from a server to a client is disclosed. The metadata include property data associated with a media file accessible by the client. The method determines that the media file is accessed by the client and submits an identification parameter associated with the accessed media file from the client to a server when the determining that the media file is accessed by the client indicates that the media file is accessed by the client. The method retrieves the property data from a structural query language (SQL) server and forwards the property data to the client.

Yet another embodiment of the invention is directed to one or more computer-readable media that has computer-executable instructions for retrieving metadata for a media file accessible via a media player. The metadata include property data associated with the media file. The computer-executable instructions for performing steps comprise determining that the media file is accessed by the media player and submitting an identification parameter associated with the accessed media file to a server when the determining that the media file is accessed by the media player indicates that the media file is accessed by the media player. The computer-executable instructions comprise receiving from the server the property data corresponding to the accessed media file.

In another embodiment, a computer-readable medium has computer-executable instructions for rendering metadata for a media file accessible via a media player. The metadata include property data associated with the media file. The computer-executable instructions for performing steps comprise determining that the media file is accessed by the media player and identifying an identification parameter of the media file stored on the media player when the determining that the media file is accessed by the media player indicates that the media file is accessed by the media player. The computer-executable instructions further determine that the property data associated with the identification parameter of the accessed media file is stored on the media player and render the property data stored on the media player.

In still another embodiment, a computer-readable medium has computer-executable instructions for rendering metadata for a media file accessible via a media player. The metadata include property data associated with the media file. The computer-executable instructions for performing steps comprise requesting the property data from a server when at least one of (a) a content ID is not stored on the media player, (b) the property data is not stored on the media player and (c) an artist ID is a known various artists value are true. The computer-executable instructions further access the property data stored on the media player when (a), (b) and (c) are false and render the property data.

In yet another embodiment, a computer-readable medium has computer-executable instructions for providing an XML document to a client. The computer-executable instructions for performing steps comprise receiving an identification parameter for an XML document from a client and determining if all necessary identification parameters are present. The computer-executable instructions retrieve any missing identification parameters when the determining if all necessary identification parameters are present indicates that identification parameters are missing. The computer-executable instructions forward the identification parameters to a structural query language (SQL) Server, receive the XML document from the SQL Server, and forward the XML document to the client.

In still another embodiment, a computer-readable medium has computer-executable instructions for transferring metadata from a server to a client. The metadata include property data associated with a media file accessible by the client. The computer-executable instructions for performing steps determine that the media file is accessed by the client and submit an identification parameter associated with the accessed media file from the client to a server when the determining that the media file is accessed by the client indicates that the media file is accessed by the client. The computer-executable instructions retrieve the property data from a structural query language (SQL) server and forward the property data to the client.

In a further embodiment, a system transfers metadata from a server to a client. The metadata include property data associated with a media file accessible by the client. The system comprises a client computer for determining that the media file is accessed by the client and submitting an identification parameter associated with the accessed media file from the client to a server when the determining that the media file is accessed by the client indicates that the media file is accessed by the client. The system comprises a server for retrieving the property data from a structural query language (SQL) server and forwarding the property data to the client.

In yet another embodiment, a computer-readable medium has stored thereon instructions for retrieving metadata for a media file accessible via a media player. The metadata include property data associated with the media file. The computer-readable medium comprises instructions for determining that the media file is accessed by the media player and instructions for submitting an identification parameter associated with the accessed media file to a server when the determining that the media file is accessed by the media player indicates that the media file is accessed by the media player. The computer-readable medium comprises instructions for receiving from the server the property data corresponding to the accessed media file.

In still another embodiment, a computer-readable medium has stored thereon instructions for rendering metadata for a media file accessible via a media player. The metadata include property data associated with the media file. The computer-readable medium comprises instructions for requesting the property data from a server when at least one of (a) a content ID is not stored on the media player, (b) the property data is not stored on the media player and (c) an artist ID is a known various artists value are true. The computer-readable medium comprises instructions for accessing the property data stored on the media player when (a), (b) and (c) are false and instructions for rendering the property data.

In yet another embodiment, a computer-readable medium has stored thereon instructions for providing an XML document to a client. The computer-readable medium comprises instructions for receiving an identification parameter for an XML document from a client and instructions for determining if all necessary identification parameters are present. The computer-readable medium comprises instructions for retrieving any missing identification parameters when the determining if all necessary identification parameters are present indicates that identification parameters are missing. The computer-readable medium comprises instructions for forwarding the identification parameters to a structural query language (SQL) Server, instructions for receiving the XML document from the SQL Server, and instructions for forwarding the XML document to the client.

Alternatively, the invention may comprise various other methods and apparatuses.

Other features will be in part apparent and in part pointed out hereinafter.

Methods and systems are described that enhance the user experience when playing various media such as CDs and DVDs. One or more databases, managed by a server, maintain metadata associated with various media. The metadata can include any type of additional information that can be of interest to a user or consumer of the media. Identification parameters associated with particular media files accessed by the user are submitted to the server to retrieve particular property data associated with such media files. Such methods and systems provide integrated exposure of multiple metadata sources to a single user based upon the current media file being played. Moreover, such methods provide the user with an opportunity to edit the content and appearance of the displayed data.

BRIEF DESCRIPTION OF THE DRAWINGS

Corresponding reference characters indicate corresponding parts throughout the drawings.

DETAILED DESCRIPTION OF THE INVENTION

Figure 1:
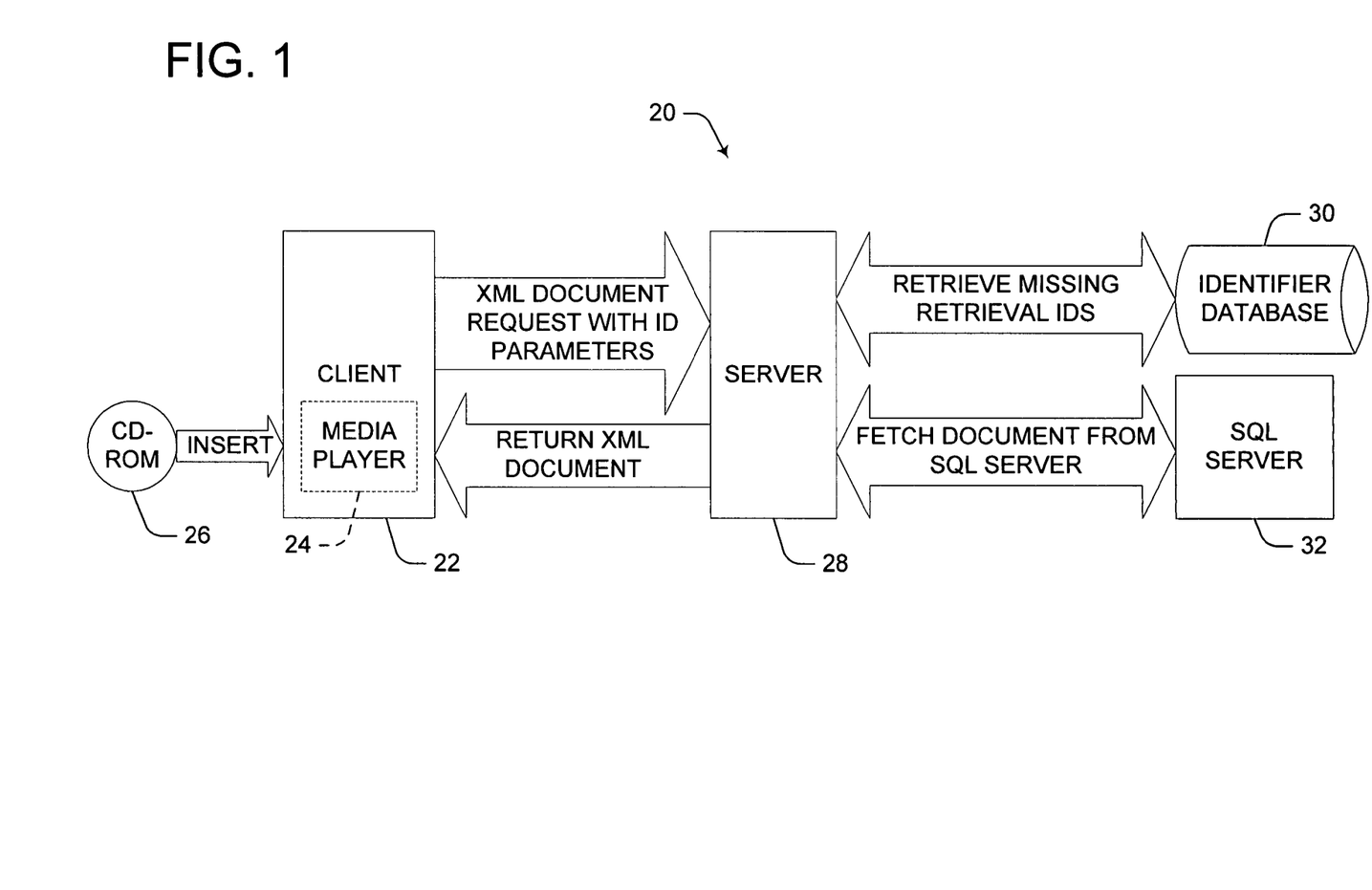
FIG. 1 is an exemplary block diagram illustrating a system of the present invention.

Referring first to FIG. 1, an exemplary block diagram illustrates a system, generally indicated 20, for implementing a method of the present invention. In an embodiment, the system 20 includes a client 22 (e.g., a personal computer) having a media player 24 capable of accessing media files stored on a CD 26. For example, the media player 24 may comprise software on a computer and a CD-ROM drive of the computer, the media file being stored on a CD 26 inserted into the CD-ROM drive. The client 22 communicates with a server 28 to request metadata associated with the media files on the CD 26. Such communication includes submitting an identification parameter associated with the accessed media file, as will be discussed in greater detail below. As noted below in greater detail, the server 28 receiving the identification parameter communicates with an identifier database 30 to retrieve any missing identification parameters, because the entire set of common identification parameters are not always available for the request, and are set to empty when unavailable. As described in greater detail below, the first request to the server 28 contains a TOC or a Content ID as its content identifier. The other identification parameters are obtained from results of former queries to the server. By returning the additional identifiers to the client as part of the XML document, the next time a request for the same CD is submitted, the specific identification parameters associated with that CD will also be submitted with the TOC or the Content ID. This feature allows the server 28 to minimize its data lookup when these extra identification parameters available. In any event, once all identification parameters are collected, they are forwarded to a Structural Query Language (SQL) Server 32. Depending upon what identification parameters are collected and forwarded, the SQL Server 32 forwards particular property data associated with the CD in the form of an eXtensible Markup Language (XML) document or documents to the server. The server then forwards the XML document or documents to the client. One skilled in the art would readily understand that such a system is also readily applicable to other media files and storage media, such as video images stored on DVD-ROMs. Others details of this system will be described in detail hereinafter.

Figure 2:
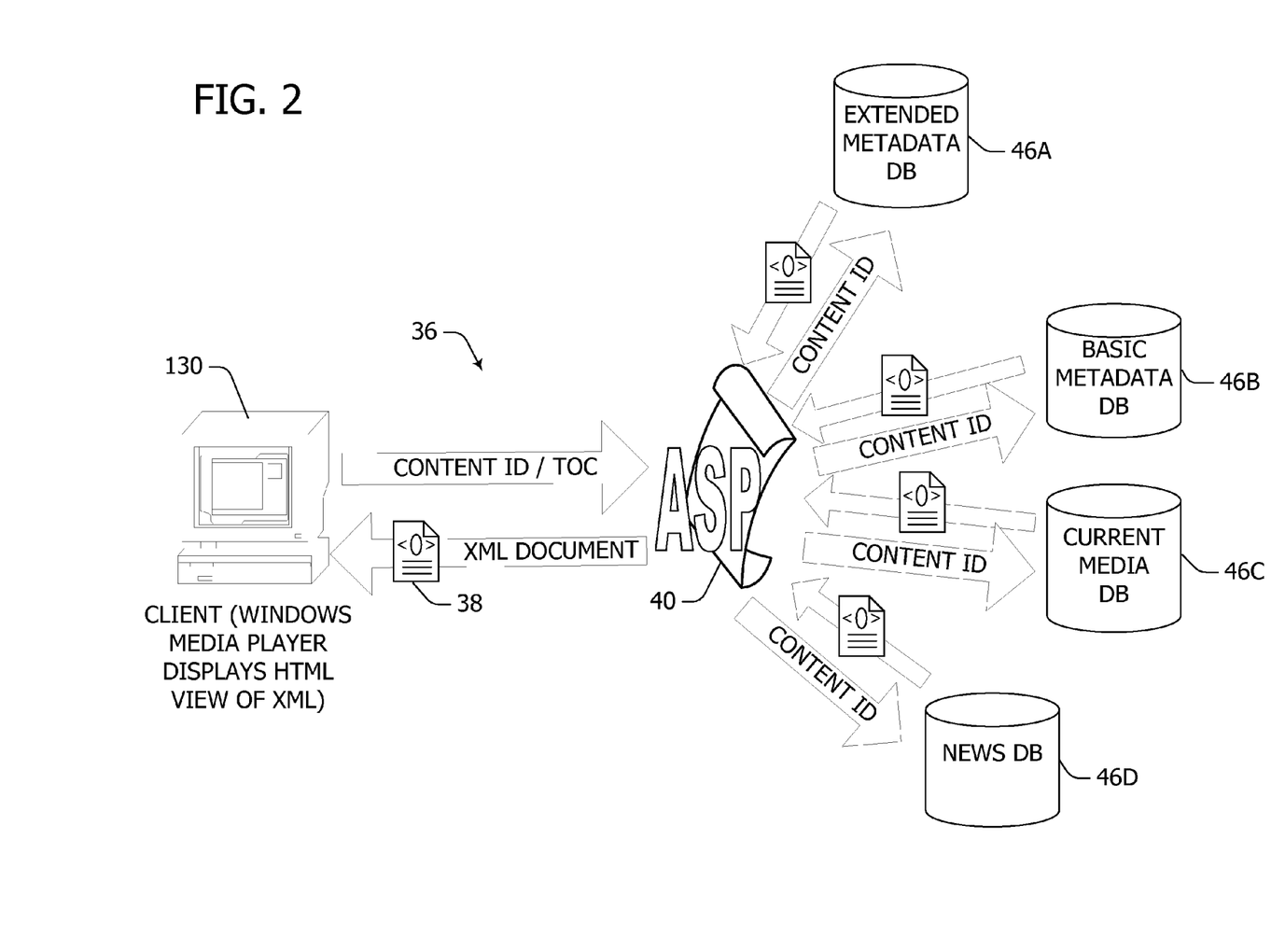
FIG. 2 is another exemplary block diagram illustrating a system of the present invention.

Turning to FIG. 2, an additional exemplary block diagram illustrates a specific system, generally indicated 36, of the present invention. This system includes a client computer 130 having software, such as Microsoft® Windows Media® Player, residing on the computer for retrieving and rendering metadata by displaying a hypertext markup language (HTML) view of an XML document 38. A set of local script pages reside as a resource in a dynamic-link library (DLL) stored with the software on the client computer 130. Such script pages may further comprise an HTML page and several hypertext component/Internet Explorer (htc/IE) behavior pages. As discussed in detail below, these pages use interfaces built within the software to submit an identification parameter, such as a content ID or a Table of Contents (TOC), of the currently accessed media file to a server side data interface. Specifically, such identification parameters are submitted to a specific Active Server Page (ASP) 40 at a Uniform Resource Locator (URL) address via Hypertext Transfer Protocol (HTTP). Parameters defining the type of metadata required, based upon a currently viewed Metadata Delivery Page, generally indicated 44 (e.g., FIG. 3), are also included with the submitted content ID. Once the identification parameters are submitted to the ASP 40, the ASP parses the parameters received from the client 22 and submits each to relevant databases 46 accessible via an SQL server. Such databases 46 comprise at least one of an extended metadata database 46A, a basic metadata database 46B, a current media database 46C and a news database 46D, to name a few. Other databases 46 are also contemplated as within the scope of the present invention. The property data of interest is then retrieved from each database 46 and forwarded to the client 22 as an XML document for parsing and rendering as HTML. The property data included in such XML documents 38 are designed to provide a contextual metadata experience for each media file as it is accessed by the client 22.

Figure 3:
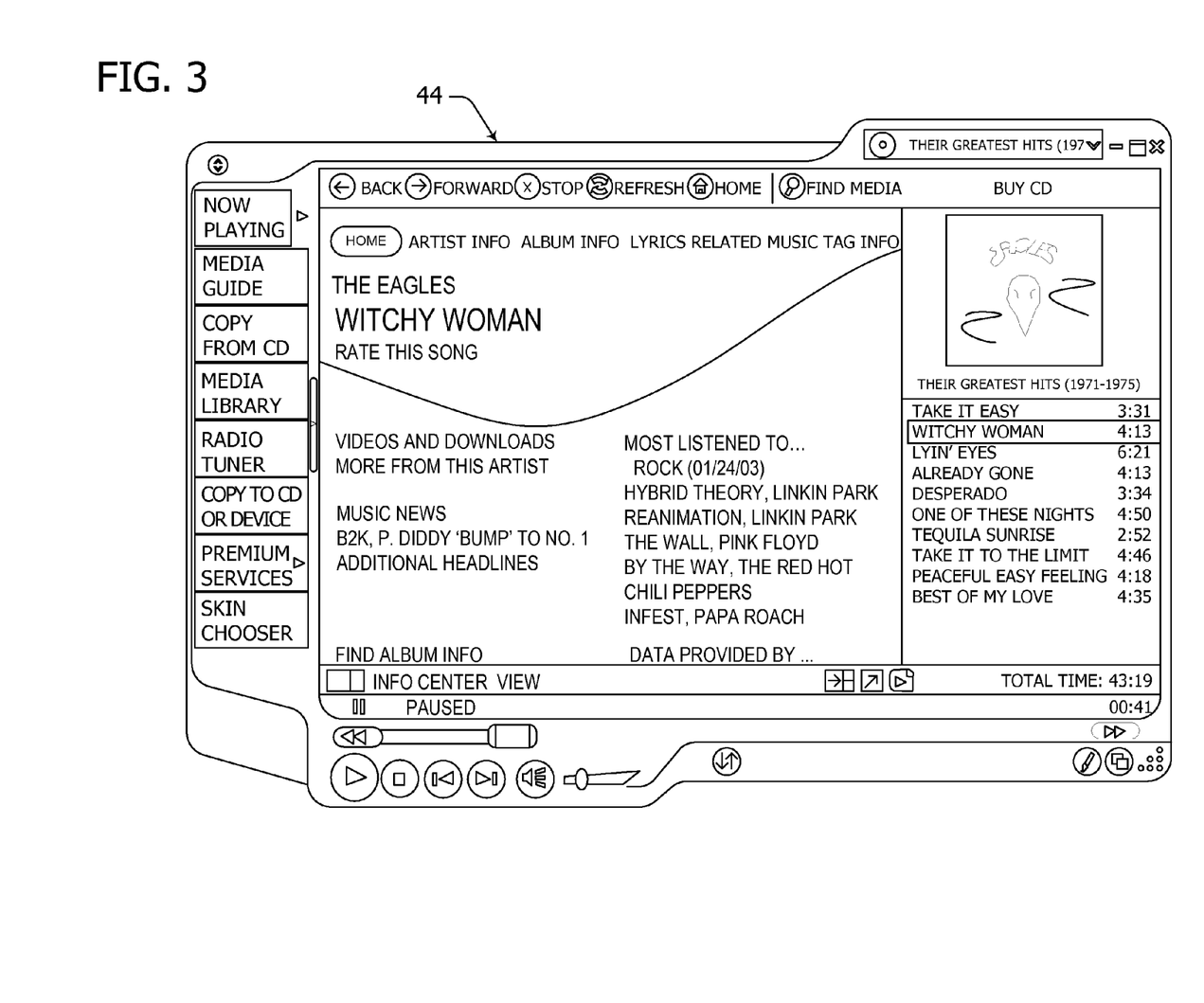
FIG. 3 is an exemplary home Metadata Delivery Page.

Referring now to FIG. 3, an exemplary home Metadata Delivery Page 44 is shown. Such a page displays various pieces of metadata (e.g., Album Name, Artist Name, Track Listing, etc.) and links for accessing several other pages of metadata (e.g., Artist Info, Lyrics, Music News). The page also displays Videos and Downloads, News and a chart of albums relevant for the currently played media. Additional pages of metadata accessible through the home Metadata Delivery Page 44 display album details, EP (Extended Play) details, singles information, track information, album reviews, artist reviews, track reviews, music news, information in chart format, artist information, biographies, compilations, latest releases, official web sites, bootlegs, videos, photos, cover art, related albums, related artists, related audio stations, media purchase information and other related metadata. For example, some document names that can be requested are identified as follows:
info_albumbuyinfo,
info_albumreview,
info_albuminfo_ecd,
info_artistbio,
info_artistinfo,
info_relatedalbums,
info_relatedartists,
info_latestreleases,
info_artistdisco,
info_ids,
info_albuminfo_bcd,
info_singlemedia,
info_moremedia,
info_relatedmedia,
info_relatedradio,
info_singlenews,
info_news,
info_newsarticle, and
info_tickets.

Figure 4:
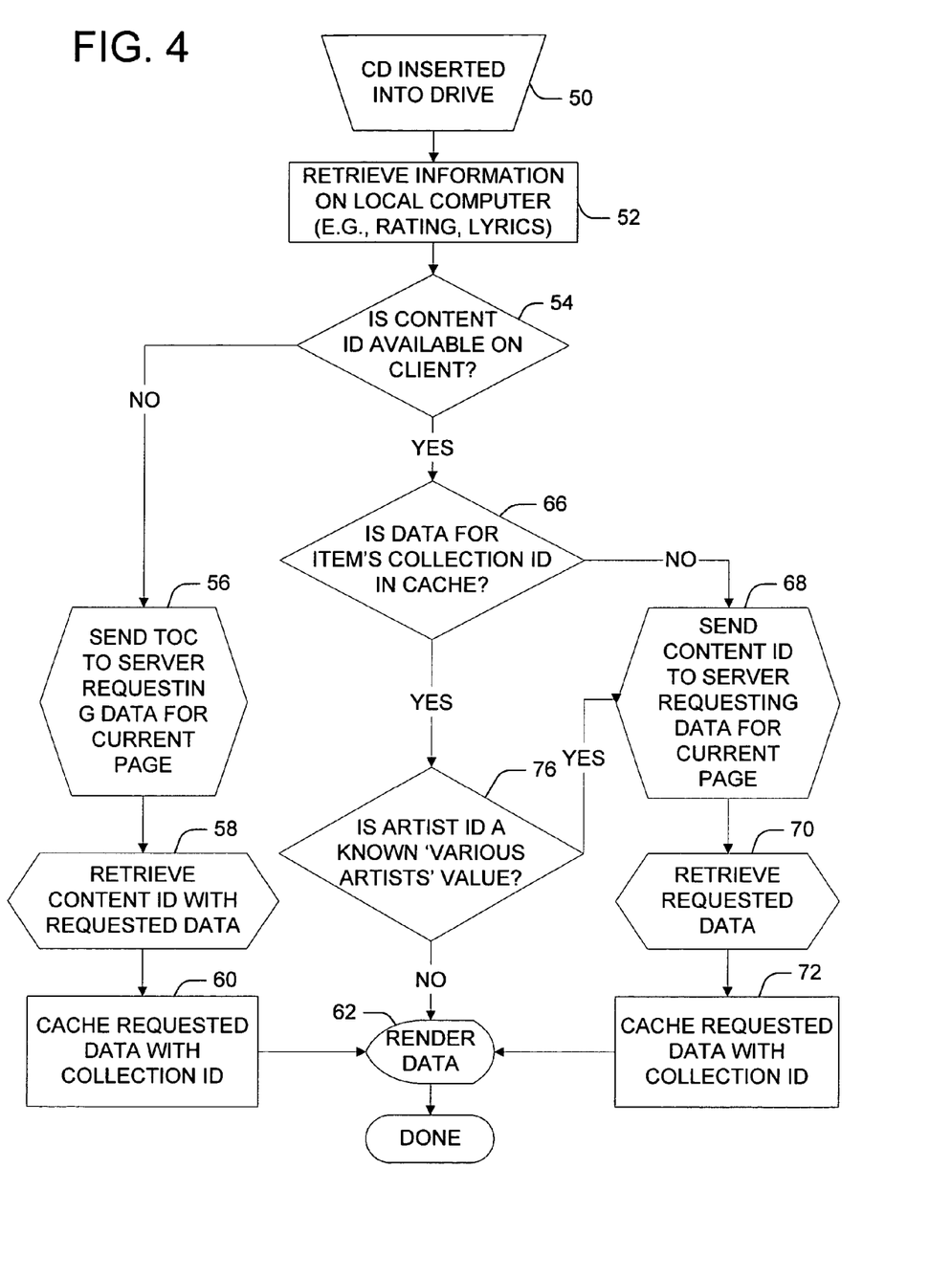
FIG. 4 is an exemplary flow chart illustrating operation of a method of the present invention on a client.

Referring now to FIG. 4, an exemplary flow chart illustrates the operation of a client system according to a method of the present invention. To begin, a CD is inserted into a CD-ROM drive of the client computer at 50. A user would typically initiate the insertion of a CD, while the remaining operations are performed without user intervention. A client without an autorun CD feature enabled would also require the user to initiate play of the media file with the media player. With autorun enabled, the method of the present invention determines that a media file is accessed by the media player, for example the CD by the CD-ROM player. Without a determination that a CD is placed within the CD-ROM, the method does not begin. Once the system determines that a media file is accessed, the system retrieves any stored data from the media player relating to the particular media file at 52. One type of such stored data is user input data previously input by the user and stored by the system during a previous access of the media file. For example, one such stored data is a rating of the media file entered by the user. When accessing a particular file, the system prompts the user for a rating of a particular media file. When the user accesses the media file in the future, such data is available for the system and user. Another such stored data may be textual information relating to the media file, again input by the user. Such textual information might include lyrics associated with the media file. Other types of stored data associated with the media file are also contemplated as within the scope of the present invention.

The system next introduces three logical queries, thereby providing four distinct flow paths through the flowchart of FIG. 4. These queries and flow paths are generally outlined here, and are discussed in detail hereinafter. The system queries (a) whether an identification parameter (e.g., a content ID) associated with the media file is not stored on the media player, (b) whether the property data is not stored on the media player and (c) whether an artist ID associated with the media file is a known various artists value. When at least one of the foregoing queries is true, the system requests the property data from the server. When each of the foregoing queries is false, however, the system accesses the property data stored on the media player. Once the source of the property data is determined, either at the server or locally on the client, the system renders the property data for the user. The property data associated with each media file, or song, is rendered individually while each media file is being accessed. Once a new media file is accessed on the same CD, the metadata associated with such a media file is rendered. Thus, all of the requested property data is downloaded initially when the CD is accessed and rendered on a per song basis when each song is played, with one exception. If the artist ID associated with the media file is a known various artists value (e.g., a compilation CD), data is requested as each subsequent media file is accessed, rather than all data simultaneously, as with a CD by a single artist. One skilled in the art would readily understand that any of these queries may be stated in the negative, yielding opposite answers and corresponding results, without departing from the scope of the present invention. Moreover, one, two or three of the queries may be utilized by the system to determine what additional actions to undertake.

Turning to the details of each flow path of the method, a first flow path is utilized when it is determined that a content ID associated with the accessed media file is not stored on the media player at 54. A content ID is an identification parameter associated with a particular media file, which particularly identifies the media file to the server when retrieving the property data. When a CD is first accessed by a media player, no content ID will be available. Without a content ID, the method must submit another identification parameter stored with the media file at 56. For example, an appropriate identification parameter is a Table of Contents (TOC) stored with a media file. When accessing a CD, the TOC is a CD table of contents cataloging the media files stored on the CD. Once the identification parameter is submitted, here the TOC, the property data is received from the server at 58, along with a content ID associated with the accessed media file, for subsequent submitting of the content ID as an identification parameter associated with the media file to the server. Should the same CD be accessed again by the same client, the content ID would be the submitted identification parameter, rather than the TOC. Once the property data is received by the client, it is cached with a collection ID defining a music album at 60. Such a collection ID comprises multiple media files accessible by the media player. Finally, the method of the present invention comprises rendering the received property data on the media player for use by a user of the media player 62.

The remaining three flow paths are utilized when it is determined that an identification parameter (e.g., a content ID) associated with the accessed media file is stored on the media player. For these paths, the media player has previously accessed this media file and a content ID has been cached on the media player during such prior access by the media player. The system no longer relies on a TOC as an identification parameter, as with the first flow path. More specifically, a second flow path is utilized when the method determines that an identification parameter is stored on the media player at 54 and that the property data is not stored on the media player at 66. Once these criteria are met, the system submits the stored content ID as its identification parameter to retrieve the property data at 68. The desired property data is then retrieved from the server and received by the client at 70, and cached with the collection ID defining a music album at 72, generally as set forth above, except that no content ID will be received or cached because the content ID was previously stored on the client. As with the first flow path, the method further comprises rendering the received property data on the media player at 62 for use by a user of the media player. As shown in FIG. 4, both determining queries, whether the identification parameter is stored on the media player 54 and whether the property data is stored on the media player 66, occur before submitting the identification parameter to the server 68.

A third flow path requires particular answers to each of the three queries noted generally above. First, the method determines that a particular identification parameter, here the content ID, is stored on the media player at 59. Second, the method determines that the property data of interest is stored on the media player at 66. Third, the method determines that an artist ID is a known various artists value on the media player at 76. In other words, the third query extends the inquiry to determine whether the CD of interest is a compilation CD. Where the artist ID is a various artists value, the content ID will be sent to the server to retrieve the property data. Because the CD could include a compilation of artists, such as a movie soundtrack, the method opts to retrieve the data from the server rather than utilizing the property data stored on the media player. This ensures that property data for each media file, by each artist on the CD, is retrieved, rather than merely rendering the data available on the media player, which may not include property data associated with each media file and artist. Caching of the received property data with a collection ID defining a music album at 72 and rendering the received property data on the media player for use by a user of the media player at 72 occur as set forth above with respect to the second flow path. As shown in FIG. 4, each of the three determining queries, whether the identification parameter is stored on the media player 54, whether the property data is stored on the media player 66, and whether an artist ID is a known various artists value on the media player 76, occur before submitting the identification parameter to the server 68.

Finally, a fourth flow path requires particular answers to each of the three queries disclosed above. Like the third flow path, the method must determine that a particular identification parameter, here the content ID, is stored on the media player 54 and that the property data of interest is stored on the media player 66. Unlike the third flow path, however, the method then determines that an artist ID is not a known various artists value on the media player at 76. In this case, the third query 76 determines that the CD of interest is not a compilation CD and the method may utilize the property data stored on the media player. Therefore, no identification parameter need be submitted to the server. Instead, the property data may be directly cached from the memory of the media player and rendered on the media player at 62 for use by a user of the media player. By verifying that the data stored on the media player is the correct property data associated with the media file, the fourth flow path provides system efficiency by not requiring access to the server to retrieve data already available on the media player.

In addition to the identification parameters disclosed above, the method of the present invention also contemplates submitting identification parameters comprising one or more of an AMG album ID (AID), an AMG performer ID (PID), an MSID person, an MSID album and a genre for identifying the media file. Other identification parameters are also contemplated as within the scope of the present invention.

Figure 5:
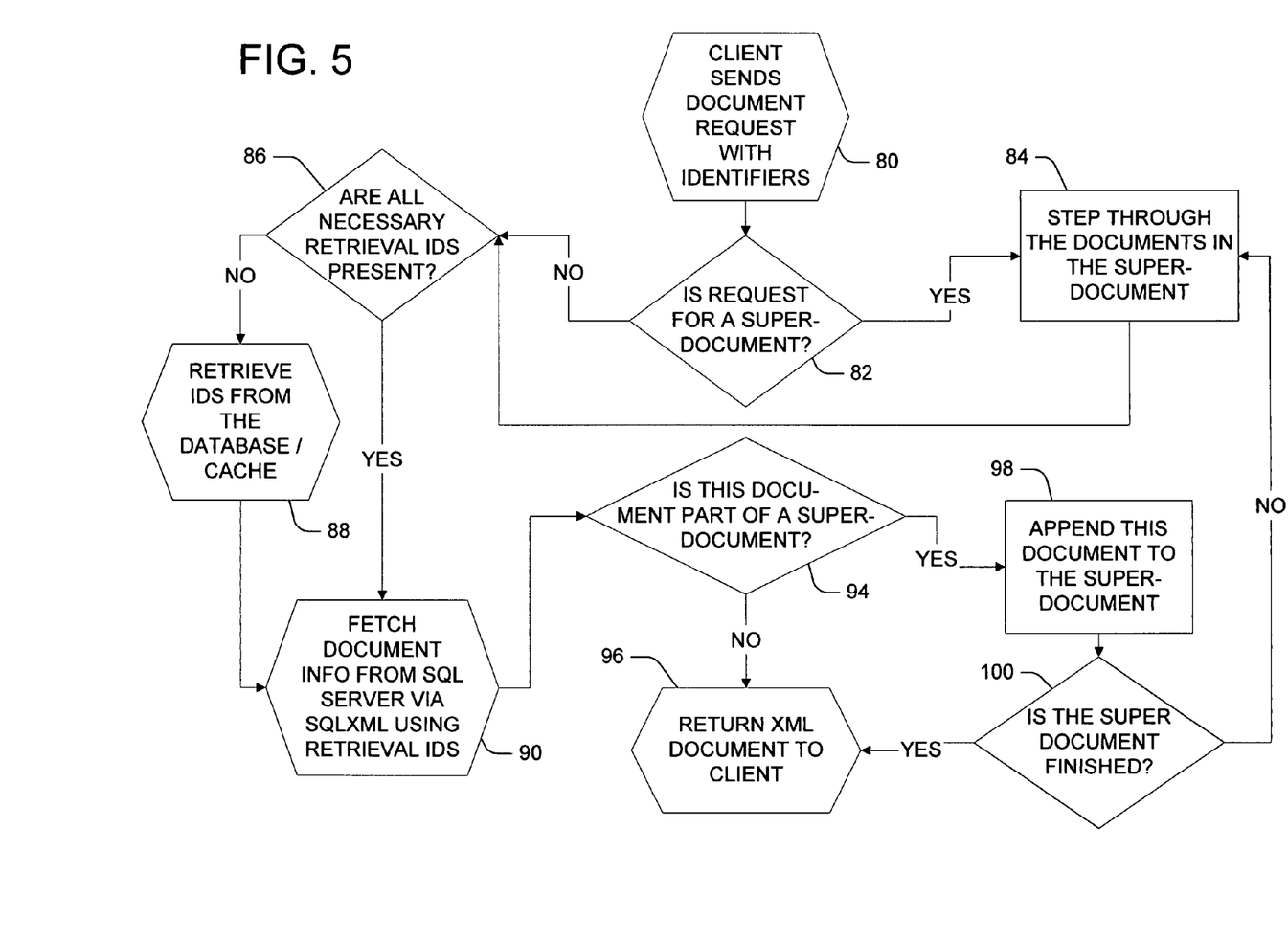
FIG. 5 is an exemplary flow chart illustrating operation of a method of the present invention on a server.

Referring now to FIG. 5, an exemplary flow chart illustrates operation of a method of the present invention on a server. The method is directed to providing property data in the form of an XML document to a client. The method is the server-side counterpart to the client-side method described in detail above. First, the client sends an identification parameter to the server and the server receives the identification parameter for an XML document at 80. Once the server receives the identification parameter, the method determines if the request is for a super-document at 82. A super-document is a document comprising two or more single XML documents merged into a single document, or super-document, to reduce network traffic between the client and the server. An example of a super-document is an info_home document. If a super-document is requested, the method then requires that the server process, or step through, each of the documents in the super-document at 84. This process is ongoing, and the method continues while the super-document processes.

The method continues by determining if all necessary identification parameters are present in the request at 86. Such identification parameters might include a content ID, a TOC, or any of the identifiers listed above or appreciated by those skilled in the art. Where the server determines that not all of the necessary identification parameters are present, the method requires retrieval of any missing identification parameters at 88. This retrieval may comprise retrieving the missing identification parameters from a cache, located on either the client or the server, or from a database. Once the missing identification parameters are retrieved, the identification parameters are forwarded to an SQL Server to fetch the documents at 90. The SQL server determines the documents that correspond to the forwarded identification parameters and sends those documents to the server, which receives the XML documents from the SQL Server and prepares an XML document for the user.

Once the document is received by the server, the method determines again if the document request is for a super-document at 94. If the request is not for a super-document, the server forwards the XML document to the client at 96. The method is then complete, and the server awaits further requests. The server will also forward any identification parameters to the client with the XML document. These parameters are then stored on the media player and may be utilized in future client requests, as discussed above. If the request is for a super-document, the requested XML document is appended to the super-document before forwarding the super-document at 88 and the XML document to the client. In addition, before returning the requested XML document to the client, the server determines if the processing, or stepping through, of the documents in the super-document is complete at 100. If such processing is not complete, the method returns to the operation of the server processing each of the documents in the super-document at 84, as described previously. This process continues and the method continues to check the status of the super-document while it is being processed, only returning the super-document and the XML document to the client when the processing of the super-document is complete. In this manner, only one XML document need be forwarded to the client.

Figure 6:
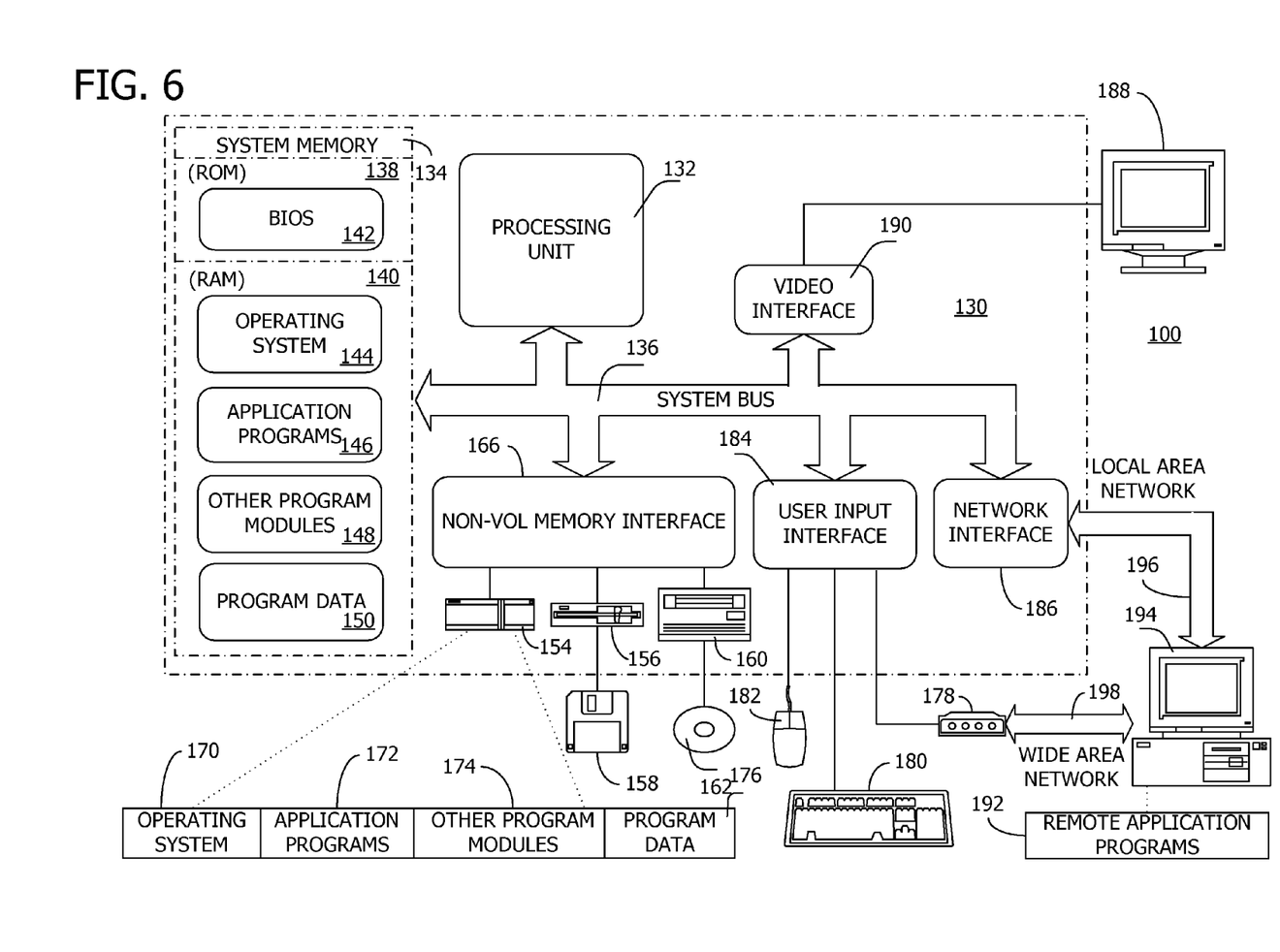
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIGS. 4 and 5 to satisfy a request for property data by transferring property data from server to client. In one embodiment, computer 130 determines that the media file is accessed by the media player. Computer 130 submits an identification parameter associated with the accessed media file to a server. Computer 130 receives from the server the property data corresponding to the accessed media file. In another embodiment, computer 130 requests property data from a server when at least one of (a) a content ID is not stored on the media player, (b) the property data is not stored on the media player and (c) an artist ID is a known various artists value are true. Computer 130 accesses the property data stored on the media player when (a), (b) and (c) are false. Computer 130 then renders the property data.

Those skilled in the art will note that operation of software routines of the invention can be implemented in numerous ways all within the scope of the invention. For example, the methods described herein may be implemented as a set of application programming interfaces (APIs) available to the media player program and to the operating system executing on computer 130. In another embodiment, the software routines described herein may be implemented as an application program executing on computer 130 that interfaces with the operating system and media player program to perform the methods described herein. In yet another embodiment, the software routines described herein may be implemented as part of the operating system executing on computer 102 with an API available to the media player.

The following example further illustrates the invention. In particular, this is an example of how the property data is retrieved from a server. This particular example uses an Album Information pane in an Info Center View of the Windows Media® Player. First, the Album Information pane calls the data access code with the required document to start the process.

```
oDL = element.document.all('dataload');
oDL.getDataAsync('info_albuminfo_bcd', loadData);
```

The access code is retrieved, the parameters are loaded out of storage, and the data access call is constructed:

```
var sTOC = element.document.all('toc').innerText, sContentID =
element.document.all('contentid').innerText, sCollectionID, sGenre;
sCollectionID = element.document.all('collectionid').innerText;
sGenre = element.document.all('genretext').innerText;
if (sTOC.length || sContentID.length)
getDataExAsync(sPage, sPageForCache,
'&toc=' + sTOC + '&content_id=' + sContentID +
'&a_id=' + AID + '&p_id='
+ PID + '&msid_person=' + MSIDPerson +
'&msid_album=' + MSIDAlbum +
'&genre=' + sGenre + sParam,
fnCallback,
sTOC + ':' + sCollectionID + ':' + sParam);
else
...
```

The URL is built in the code, with the static parameters of locale and player version:

```
function getXMLUrl(sPage, sParams, sVersion)
{
return 'http://windowsmedia.com/redir/servedocument.asp?locale=
<http://windowsmedia.com/redir/servedocument.asp?locale=>' +
L_CurrentLocale_Text + '&version=' + sVersion + '&doc=' + sPage +
sParams;
}
```

The cache is verified to determine if the property data is previously cached and the request for the media need not be forwarded to the server:

```
oCache = aDataCache[sPageForCache];
fDoDownload = true;
if (oCache)
{
if (!IsVAGUID(MSIDPerson))
{
if (sCacheKey.length && (oCache.key == sCacheKey))
{
if (oCache.xml)
{
```

-continued

```
oXML = oCache.xml;
oCache.url = oXML.url;
fDoDownload = false;
        }
     }
   }
 }
}
```

Once it is verified that the request indeed needs to be submitted, the request is forwarded to the server asynchronously:

```
var oXML = new ActiveXObject('Microsoft.XMLDOM');
oXML.async = true;
oXML.onreadystatechange = fnCallback;
oXML.load(sUrl);
```

Upon receipt of the property data, the data is placed in the client cache:

```
oCache = CreateCacheEntry(sCacheKey, oXMLt, sUrl, fnCallback)
if (sCacheKey.length)
aDataCache[sPageForCache] = oCache;
```

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of retrieving metadata for a media file accessible via a media player, said metadata including property data associated with the media file, comprising:
   determining that the media file is accessed by the media player;
   determining whether an identification parameter is stored on the media player;
   determining whether property data is stored on the media player;
   determining whether an artist ID is a known various artists value on the media player, said known various artists value indicating the media file is associated with a compilation of artists;
   submitting, to a server, an identification parameter associated with the accessed media, said submitting being responsive to the media file being accessed by the media player and occurring after determining whether the identification parameter and the property data are stored on the media player and after determining whether the artist ID is a known various artists value;
   receiving from the server the property data corresponding to the accessed media file; and
   caching the received property data with a collection ID in response to the identification parameter being stored on the media player, the property data being stored on the media player, and the artist ID being a known various artists value on the media player.

2. A method as set forth in claim 1 further comprising rendering the received property data on the media player for use by a user of the media player.

3. A method as set forth in claim 1 wherein the identification parameter is a content ID cached on the media player during prior access of the media file by the media player.

4. A method as set forth in claim 1 wherein the collection ID defines a music album comprising multiple media files accessible by the media player.

5. A method as set forth in claim 1 further comprising:
   determining whether a content ID associated with the accessed media file is stored on the media player, and
   caching the received property data with a collection ID when said determining whether a content ID is stored on the media player indicates that the content ID is not stored on the media player, said determining whether a content ID associated with the accessed media file is not stored on the media player occurring before the submitting.

6. A method as set forth in claim 5 wherein the collection ID defines a music album comprising multiple media files accessible by the media player.

7. A method as set forth in claim 5 wherein the submitted identification parameter is a Table of Contents (TOC) stored with the media file.

8. A method as set forth in claim 7 wherein the receiving comprises receiving a content ID associated with the accessed media file for subsequent submitting of the content ID as an identification parameter associated with the media file to the server.

9. A method as set forth in claim 7 wherein the media file is stored on a compact disc for access of the media file via the media player.

10. A method as set forth in claim 9 wherein the TOC is a compact disc table of contents cataloging media files stored on the compact disc.

11. A method as set forth in claim 1 wherein the identification parameter is at least one of a content ID, a compact disc table of contents (TOC), an AMG album ID (AID), an AMG performer ID (PID), an MSID person, an MSID album and a genre for identifying the media file.

12. A method as set forth in claim 1 wherein the media player comprises a computer and a CD-ROM drive, said media file being stored on a compact disc inserted into the CD-ROM drive of the computer.

13. A method as set forth in claim 1 wherein the media file is a song and the property data is associated with the song.

14. A method as set forth in claim 1 further comprising retrieving stored data from the media player relating to the media file, said stored data comprising data input by a user of the media player.

15. A method as set forth in claim 14 wherein the stored data is at least one of a rating of the media file, textual information relating to the media file and lyrics associated with the media file.

16. A method of retrieving metadata for a media file accessible via a media player, said metadata including property data associated with the media file, comprising:
- determining whether a first identification parameter associated with the media file is stored on the media player;
- submitting, to a sewer, a second identification parameter associated with the accessed media file, said submitting being in response to the first identification parameter not being stored on the media player, said property data being received in response to the submission of the second identification parameter;
- determining whether the property data is stored on the media player, said determining being in response to the first identification parameter being stored on the media player;
- submitting, to a server, the first identification parameter associated with the accessed media file, said submitting being in response to the first identification parameter being stored on the media player and the property data not being stored on the media player, said property data being received in response to the submission of the first identification parameter;
- determining whether an artist ID is a known various artists value on the media player, said known various artists value indicating the media file is associated with a compilation of artists, said determining being in response to the property data being stored on the media player;
- submitting, to a server, the first identification parameter associated with the accessed media file, said submitting being in response to the artist ID being a known various artist value, said property data being received in response to the submission of the first identification parameter; and
- rendering, on the media player, the property data, said rendering being in response to the artist ID not being a known various artists value.

17. A method as set forth in claim 16 wherein each of said submittings fUrther comprises retrieving the property data from the server.

18. A method as set forth in claim 17 wherein each of said submittings fUrther comprises rendering the property data on the media player.

19. A method as set forth in claim 18 further comprising determining that the media file is accessed by the media player, said determining that the media file is accessed occurring before the determining whether a first identification parameter is stored on the media player.

20. A method as set forth in claim 16 wherein the first identification parameter is a content ID associated with the accessed media file.

21. A method as set forth in claim 16 wherein the second identification parameter is a table of contents (TOC) associated with the accessed media file.

22. A method as set forth in claim 21 wherein the media file is stored on a compact disc.

23. A computer-readable storage medium having computer-executable instructions for retrieving metadata for a media file accessible via a media player, said metadata including property data associated with said media file, said computer-executable instructions for performing steps comprising:
- determining that the media file is accessed by the media player;
- determining whether an identification parameter is stored on the media player;
- determining whether property data is stored on the media player;
- determining whether an artist ID is a known various artists value on the media player, said known various artists value indicating the media file is associated with a compilation of artists;
- submitting, to a server, an identification parameter associated with the accessed media file, said submitting being responsive to the media file being accessed by the media player and occurring after determining whether the identification parameter and the property data are stored on the media player and after determining whether the artist ID is a known various artists value;
- receiving from the server the property data corresponding to the accessed media file; and
- caching the received property data with a collection ID in response to the identification parameter being stored on the media player, the property data being stored on the media player, and the artist ID being a known various artists value on the media player.

24. A computer-readable storage medium as set forth in claim 23 further comprising computer-executable instructions for performing steps comprising rendering the received property data on the media player for use by a user of the media player.

25. A computer-readable storage medium as set forth in claim 23 further comprising computer-executable instructions for performing steps comprising:
- determining, before said submitting, whether a content ID associated with the accessed media file is stored on the media player, and
- caching the received property data with a collection ID when said determining whether a content ID is stored on the media player indicates that the content ID is not stored on the media player.

26. A computer-readable storage medium having stored thereon instructions for retrieving metadata for a media file accessible via a media player, said metadata including property data associated with said media file, said computer-readable storage medium comprising:
- instructions for determining that the media file is accessed by the media player;
- instructions for determining whether an identification parameter is stored on the media player;
- instructions for determining whether property data is stored on the media player;
- instructions for determining whether an artist ID is a known various artists value on the media player, said known various artists value indicating the media file is associated with a compilation of artists;
- instructions for submitting, to a server, an identification parameter associated with the accessed media, said submitting being responsive to the media file being accessed by the media player and occurring after determining whether the identification parameter and the property data are stored on the media player and after determining whether the artist ID is a known various artists value;
- instructions for receiving from the server the property data corresponding to the accessed media file; and
- instructions for caching the received property data with a collection ID in response to the identification parameter being stored on the media player, the property data being stored on the media player, and the artist ID being a known various artists value on the media player.

* * * * *